United States Patent
Deisinger et al.

(10) Patent No.: US 10,454,881 B2
(45) Date of Patent: Oct. 22, 2019

(54) SYSTEMS AND METHODS FOR CONFIGURING AN IPV4 PROCESS WITHOUT ASSOCIATING THE IPV4 PROCESS WITH AN IP LOOPBACK ADDRESS

(71) Applicants: Mark V Deisinger, Roseville, MN (US); Robert L Bergerson, Roseville, MN (US)

(72) Inventors: Mark V Deisinger, Roseville, MN (US); Robert L Bergerson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 883 days.

(21) Appl. No.: 14/878,334

(22) Filed: Oct. 8, 2015

(65) Prior Publication Data

US 2017/0104716 A1    Apr. 13, 2017

(51) Int. Cl.
    *H04L 29/12*        (2006.01)
(52) U.S. Cl.
    CPC ...... *H04L 61/2007* (2013.01); *H04L 61/2092* (2013.01)
(58) Field of Classification Search
    USPC .......................................... 709/220–226, 245
    See application file for complete search history.

(56) References Cited

U.S. PATENT DOCUMENTS

| | | | | |
|---|---|---|---|---|
| 6,192,417 B1* | 2/2001 | Block | ................. | H04L 12/1818 370/390 |
| 2004/0088546 A1* | 5/2004 | Shah | .................. | G06Q 20/3674 713/168 |
| 2013/0238769 A1* | 9/2013 | Asati | ..................... | H04L 61/103 709/220 |
| 2013/0286985 A1* | 10/2013 | Yin | ..................... | H04L 61/2007 370/329 |

* cited by examiner

*Primary Examiner* — Younes Naji
*Assistant Examiner* — Da T Ton

(57) ABSTRACT

Systems and methods configuring a process that uses IPv4 communication without associating the IPv4 process with an IP loopback address are disclosed. Embodiments may include receiving a message to configure an IPv4 process. Embodiments may also include determining if a configuration parameter associated with the received message is set to indicate that one or more default IP loopback addresses are to be used as IP loopback addresses to associate with the IPv4 process. Embodiments may further include completing the configuration of the IPv4 process without associating an IP loopback address with the IPv4 process when the configuration parameter is determined to not be set to indicate that one or more default IP loopback addresses are to be used as IP loopback addresses to associate with the IPv4 process.

12 Claims, 4 Drawing Sheets

SYSTEMS AND METHODS FOR CONFIGURING AN IPV4 PROCESS WITHOUT ASSOCIATING THE IPV4 PROCESS WITH AN IP LOOPBACK ADDRESS

FIELD OF THE DISCLOSURE

The instant disclosure relates to computing systems. More specifically, this disclosure relates to the configuration of an IPv4 process on a computing system without associating the IPv4 process with an IP loopback address.

BACKGROUND

In some computing systems, an IPv4 process must typically be associated with at least one IP loopback address. In other words, when configuring an IPv4 process on some systems, the IPv4 process must be associated with an IP loopback address during configuration. If the configuration does not associate an IP loopback address with the IPv4 process, then the configuration of the IPv4 process may be terminated and/or flagged as an erroneous configuration.

However, for some uses of the IPv4 process, associating the IPv4 process with an IP loopback address may not be necessary. But because associating the IPv4 process with an IP loopback address is required by some methods for configuring IPv4 processes, the association must be done even when such an association is likely not necessary for a particular use of the IPv4 process. As a result, unnecessary time, and consequently money, may be wasted in an attempt to determine and specify unused IP loopback addresses to associate with the IPv4 process being configured on the computing system for a use that does not require the association of an IP loopback address to the IPv4 process. Accordingly, these means for configuring IP processes on computing systems are less than optimal.

SUMMARY

The configuration of an IPv4 process on a computing system may be improved through the development of an IPv4 configuration process in which the IPv4 process can be configured on the computing system without associating it with an IP loopback address. In particular, a method for configuring a process that uses IPv4 communication without associating the IPv4 process with an IP loopback address may include receiving, by a processor, a message to configure an IPv4 process. The method may also include determining, by the processor, if a configuration parameter associated with the received message is set to indicate that one or more default IP loopback addresses are to be used as IP loopback addresses to associate with the IPv4 process. The method may further include completing, by the processor, the configuration of the IPv4 process without associating an IP loopback address with the IPv4 process when the configuration parameter is determined to not be set to indicate that one or more default IP loopback addresses are to be used as IP loopback addresses to associate with IPv4 process.

According to another embodiment, a computer program product may include a non-transitory computer-readable medium comprising instructions which, when executed by a processor of a computing system, cause the processor to perform the step of receiving a message to configure an IPv4 process. The medium may also include instructions which, when executed by a processor of a computing system, cause the processor to perform the step of determining if a configuration parameter associated with the received message is set to indicate that one or more default IP loopback addresses are to be used as IP loopback addresses to associate with the IPv4 process. The medium may further include instructions which, when executed by a processor of a computing system, cause the processor to perform the step of completing the configuration of the IPv4 process without associating an IP loopback address with the IPv4 process when the configuration parameter is determined to not be set to indicate that one or more default IP loopback addresses are to be used as IP loopback addresses to associate with the IPv4 process.

According to yet another embodiment, an apparatus may include a memory and a processor coupled to the memory. The processor may be configured to execute the step of receiving a message to configure an IPv74 process. The processor may also be configured to execute the step of determining if a configuration parameter associated with the received message is set to indicate that one or more default IP loopback addresses are to be used as IP loopback addresses to associate with the IPv4 process. The processor may be further configured to execute the step of completing the configuration of the IPv4 process without associating an IP loopback address with the IPv4 process when the configuration parameter is determined to not be set to indicate that one or more default IP loopback addresses are to be used as IP loopback addresses to associate with the IPv4 process.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

By developing an IPv4 configuration process in which the IPv4 process can be configured on the computing system without associating it with an IP loopback address, the configuration of an IPv4 process on a computing system may be improved so as to remove the primary drawbacks of conventional means for configuring IPv4 processes on computing systems. For example, when an IPv4 process need not be associated with an IP loopback address in order to perform the functions for which the IPv4 process was developed, the IPv4 process can be configured on the computing system without terminating erroneously and without being associated with an IP loopback address. As a result, the unnecessary time and money wasted by conventional means for configuring IPv4 processes on computing systems may be reduced, if not eliminated.

An IPv4 process may be a process, also referred to as an application, that utilizes internet protocol version 4 as a communications protocol. An IP loopback address may be an IP address which can be used as the destination address of a message when the computing system wants the message to be sent to itself. Thus, an IP loopback address may also be referred to as a self-address. In some embodiments, the range of IP addresses from 127.0.0.0 to 127.255.255.255 may be used as IP loopback addresses. When a message, such as an IP datagram, is sent to a loopback address, the message may not be passed down to the data link layer for transmission. Instead, the message may loop back to the computing system at the IP level. IP loopback addresses are often used for testing purposes, such as, for example, to test the implementation of the IPv4 protocol on the computing system. For example, when a computing system creates a message packet with destination address as an IP loopback address, the higher layers in the IP protocol may be tested without problems at the lower layers, such as interference from a Network Interface Controller (NIC), manifesting themselves.

Figure 1:
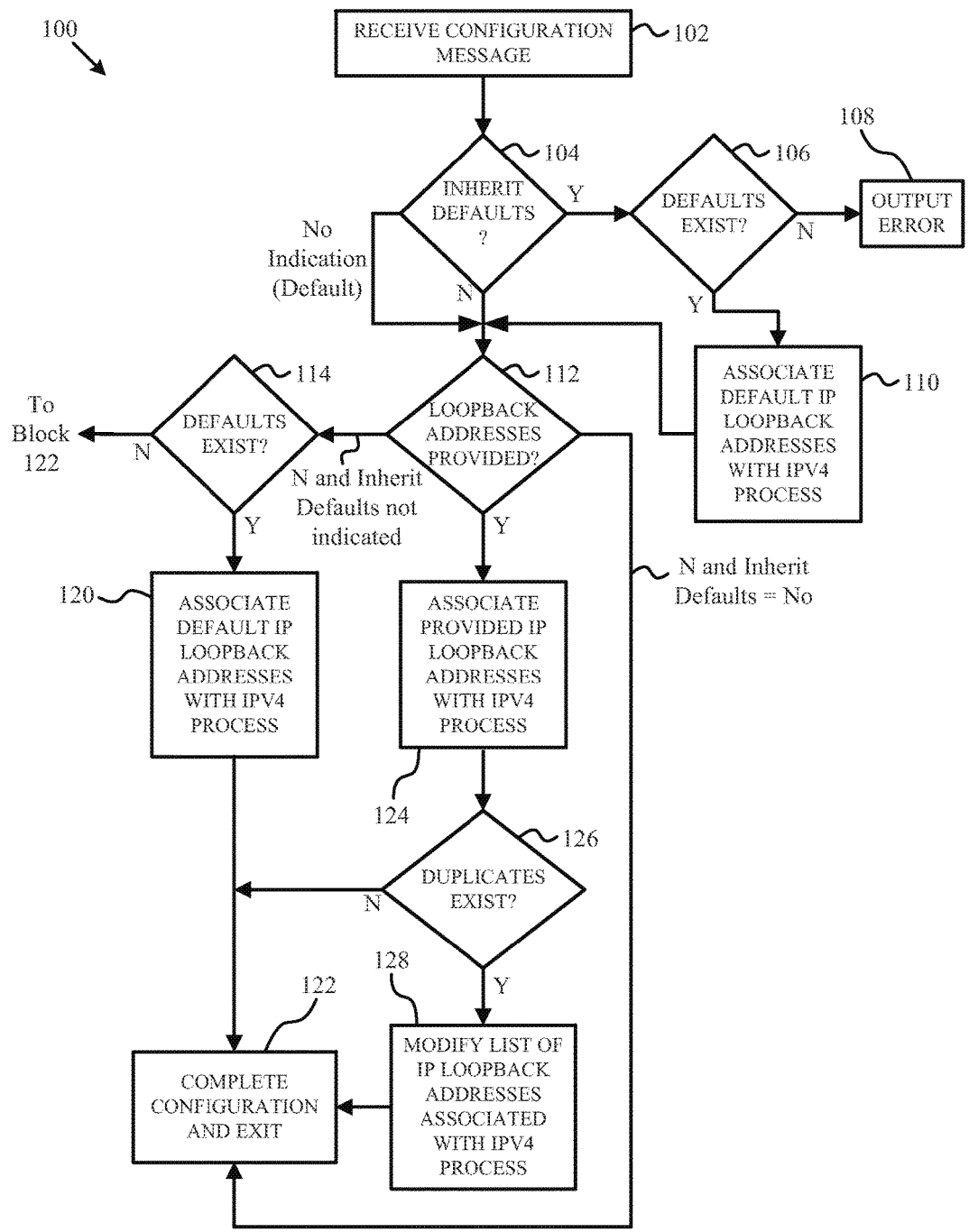
FIG. 1 is a flow chart illustrating the configuration of a process that uses IPv4 communication according to one embodiment of the disclosure.

FIG. 1 is a flow chart illustrating the configuration of a process that uses IPv4 communication according to one embodiment of the disclosure. It is noted that embodiments of method 100 may be implemented in accordance with the systems and embodiments described herein with respect to FIGS. 3-4. For example, embodiments of method 100 may be implemented by network 300 or computer system 400. In general, embodiments of method 100 may be implemented by other similar systems without deviating from this disclosure so long as the systems, whether directly or indirectly, support the operations as described herein.

Specifically, flow 100 includes, at block 102, receiving a message to configure an IPv4 process. For example, a processor operating on a computing system may receive a message to configure an IPv4 process on the computing system. In some embodiments, the message may be received based on user input. In another embodiment, the message may be received based on a triggering event, such as, for example, the execution of a particular instruction in a configuration sequence.

At block 104, the processor may determine whether or not to inherit default IP loopback addresses to associate with the IPv4 process being configured on the computing system. For example, in one embodiment, the processor may determine if a configuration parameter associated with the received message is set to indicate that one or more default IP loopback addresses are to be used as IP loopback addresses to associate with the IPv4 process. According to one embodiment, the configuration parameter may be a parameter within the received message requesting configuration of an IPv4 process. In another embodiment, the configuration parameter may be a parameter transmitted along with the message, but not part of the information that makes up the message. In some embodiments, the configuration parameter may have been set based on user input, such as input from a network administrator. In another embodiment, the configuration parameter may have been set based on a triggering event, such as, for example, the execution of a particular instruction by the computing system. In some embodiments, the configuration parameter may not have been set to provide any indication. For example, in some embodiments the configuration parameter may not have been set to indicate that default IP loopback addresses should or should not be inherited. Thus, the configuration parameter may remain in a default setting.

If, at block 104, the processor determines that the configuration parameter is set to indicate that one or more default IP loopback addresses are to be used as IP loopback addresses to associate with the IPv4 process, then flow 100 may proceed to block 106. At block 106, the processor may determine if the default IP loopback addresses exist. For example, in one embodiment, the processor may determine if the one or more default loopback addresses exist in a memory. According to one embodiment, the default IP loopback addresses may have been stored in a memory location within the computing system. For example, in one embodiment, before the configuration of the IPv4 process was initiated, a user, such as a network administrator, may have specified default IP loopback addresses which can be associated with an IPv4 process. In response, the computing system may have stored the specified default IP loopback addresses in a memory location which can be accessed by the computing system when an IPv4 process is to be configured on the computing system.

If, at block 106, the processor determines that the one or more default IP loopback addresses do not exist in a memory, then flow 100 may proceed to block 108. At block 108, the processor may be configured to output an error signal. In some embodiments, the error may exist because at block 104 the computing system received an indication that default IP loopback addresses should be used to associate the Ipv4 process being configured on the computing system with an IP loopback address, but at block 106 the processor determined that no default IP loopback addresses exist or that no default IP loopback addresses have been specified. Thus, as indicated at block 108 of flow 100, the processor may be configured to output an error signal when the one or more default IP loopback addresses are determined to not exist in the memory and the configuration parameter is determined to be set to indicate that one or more default IP loopback addresses are to be used as IP loopback addresses to associate with the IPv4 process.

In some embodiments, an error signal may include a notification sent to a user interface device indicating that the configuration terminated with an error, and therefore was not completed. In another embodiment, the error signal may include recording in a log that the configuration terminated because of an error. In general, the output error signal may be any type of signal so long as it relays an indication that the configuration was terminated with an error.

If, however, at block 106, the processor determines that the one or more default IP loopback addresses do exist in a memory, then flow 100 may proceed to block 110. At block 110, the processor may associate one or more default IP loopback addresses with the IPv4 process being configured on the computing system. In other words, the processor may complete a portion of the configuration sequence, namely the association of the IPv4 process with at least one default IP loopback address. In particular, at block 110, in response to a determination at block 106 that the one or more default IP loopback addresses exist in memory, the processor may associate an IP loopback address of the one or more default IP loopback addresses with the IPv4 process when the configuration parameter is determined to be set to indicate that one or more default IP loopback addresses are to be used as IP loopback addresses to associate with the IPv4 process.

As indicated in FIG. 1, flow 100 may proceed to block 112 after default IP loopback addresses have been associated with the IPv4 process, such as at block 110. However, as also indicated in FIG. 1, flow 100 may also proceed to block 112 when the processor determines at block 104 that the configuration parameter is set to indicate that no default IP loopback addresses are to be used as IP loopback addresses to associate with the IPv4 process. Further indicated in FIG. 1 is that flow 100 may also proceed to block 112 when the processor determines at block 104 that the configuration parameter is not set to provide any indication. For example, the configuration parameter may not have been set to indicate that default IP loopback addresses should or should not be inherited. In other words, as a default, flow 100 may proceed to block 112 from block 104.

At block 112, the processor may determine whether IP loopback addresses were provided with the received message, such as the message received at block 102. In other words, the processor may determine if addresses of one or more IP loopback addresses to associate with the IPv4 process have been received in association with the message. According to one embodiment, the IP loopback addresses to associate with the IPv4 process may be embedded within the received message requesting configuration of an IPv4 process. In another embodiment, the IP loopback addresses to associate with the IPv4 process may be IP addresses transmitted along with the message, but not part of the information that makes up the message.

In some embodiments, IP loopback addresses provided with the received message to configure the IPv4 process may be provided when initiating the configuration of the IPv4 process. For example, in some embodiments, the IP loopback addresses may have been specified based on user input, such as input from a network administrator. In another embodiment, the IP addresses may have been received along with the message based on a triggering event, such as, for example, the execution of a particular instruction by the computing system. However, in some embodiments, even when the IP addresses may have been received along with the message based on a triggering event, the IP addresses may still have been specified by a user when initiating the configuration of the IPv4 process. Thus, in some embodiments, the determination at block 112 may refer to a determination of whether or not a user provided IP loopback addresses to associate with the IPv4 process when initiating the configuration of the IPv4 process.

If, at block 112, the processor determines that no addresses of one or more IP loopback addresses to associate with the IPv4 process were received in association with the received message and the processor already determined, such as at block 104, that the configuration parameter was in a default setting, then flow 100 may proceed to block 114. For example, in some embodiments, flow 100 may proceed to block 114 when the processor determines at block 112 that a user did not provide, when initiating a configuration of the IPv4 process, one or more IP loopback addresses to associate with the IPv4 process during configuration of the IPv4 process and that the configuration parameter was in a default setting, for example, as determined at block 104.

At block 114, the processor may determine if default IP loopback addresses exist. In some embodiments, the processor may not have already made the determination as to whether or not default IP loopback addresses exist. Therefore, in some embodiments, if the processor has not already made such a determination during the configuration of the IPv4 process, then at block 114, the processor may perform the actions described with reference to block 106 to determine if the default IP loopback addresses exist. If, however, the processor has already made the determination as to whether or not default IP loopback addresses exist or not, such as, for example, by performing the actions disclosed with reference to block 106, then, at block 114, the processor may forego the determination and use the results of the previous determination, such as a determination made at block 106.

If, at block 114, the processor determines that one or more default IP loopback addresses do not exist in a memory, then flow 100 may proceed to block 122, which is described below, to complete the configuration of the IPv4 process without associating an IP loopback address with the IPv4 process. If, however, at block 114, the processor determines that one or more default IP loopback addresses do exist in a memory, then flow 100 may proceed to block 120. At block 120, the processor may associate one or more default IP loopback addresses with the IPv4 process being configured on the computing system. Associating one or more default IP loopback addresses with the IPv4 process at block 120 may refer to the same operations performed at block 110, wherein one or more default IP loopback addresses are also associated with the IPv4 process. Thus, the discussion associated with reference to block 110 regarding association of one or more default IP loopback addresses with the IPv4 process may also apply to block 120. In some embodiments, flow 100 may proceed to block 122 after default IP loopback addresses have been associated with the IPv4 process, such as at block 120.

At block 122, the processor may complete the configuration of the IPv4 process and exit. In some embodiments, the completion of the configuration and the exiting may be performed without outputting an error signal and without having associated an IP loopback address provided by a user with the IPv4 process being configured on the computing system. In other words, in some embodiments, an exit indicated at block 122 may represent the completion of the configuration of the IPv4 process without associating an IP loopback address provided by a user with the IPv4 process. For example, in one embodiment, if at block 104, the processor determines that the configuration parameter is not set because it is still in its default setting, and if at block 112, the processor determines that no addresses of one or more IP loopback addresses to associate with the IPv4 process were received in association with the message, then flow 100 may proceed to block 122 via blocks 114 and 120 to complete the configuration of the IPv4 process without associating an IP loopback address provided by a user with the IPv4 process and exit. More specifically, in some embodiments, associating an IPv4 process with IP loopback addresses may refer to associating an IPv4 process with IP loopback addresses provided by a user when initiating a configuration of the IPv4 process, such as association described with reference to block 124. Thus, by associating IP loopback addresses with the IPv4 process via default IP loopback addresses instead of IP loopback addresses provided by a user when initiating the configuration of the IPv4 process, the processor may complete configuration of the IPv4 process without having associated IP loopback addresses provided by a user with the IPv4 process. Therefore, in some embodiments, the processor may complete the configuration of the IPv4 process without associating an IP loopback address provided by a user with the IPv4 process when the configuration parameter is determined to not be set to indicate that one or more default IP loopback addresses are to be used as IP loopback addresses to associate with the IPv4 process.

Returning to block 112, if, at block 112, the processor determines that the addresses of one or more IP loopback addresses to associate with the IPv4 process were received in association with the message, then flow 100 may proceed to block 124. For example, in some embodiments, flow 100 may proceed to block 124 when the processor determines at block 112 that a user provided, when initiating a configuration of the IPv4 process, one or more IP loopback addresses to associate with the IPv4 process during configuration of the IPv4 process.

At block 124, the processor may associate the one or more IP loopback addresses provided with the message with the IPv4 process when the addresses of one or more IP loopback addresses to associate with the IPv4 process are determined, such as at block 112, to have been received in association with the message. In some embodiments, associating the one or more IP loopback addresses provided with the message with the IPv4 process, such as at block 124, may refer to association because the IP loopback addresses provided with the message may have been provided by a user when initiating the configuration of the IPv4 process. In other words, because the one or more IP loopback addresses may have been provided, the one or more IP loopback addresses associated with the IPv4 process at block 124 may be referred to as having been associated with the IPv4 process. As illustrated in FIG. 1, in some embodiments, after the processor associates the one or more IP loopback addresses provided with the message with the IPv4 process at block 124, flow 100 may proceed to block 126.

At block 126, the processor may determine if duplicates of an IP loopback address have been associated with the IPv4 process. In particular, the processor may determine if an IP loopback address included in the one or more IP loopback addresses received in association with the message and associated with the IPv4 process is also included in the one or more default IP loopback addresses associated with the IPv4 process. If the processor determines that there are no duplicates associated with the IPv4 process, then flow 100 may proceed to block 122 wherein the configuration of the IPv4 process is completed and the configuration process is exited. In some embodiments, if flow 100 proceeds to block 122 through block 126, then completion of the configuration at block 122 may include association of the IPv4 process with at least an IP loopback address received in association with the message, such as at block 124, or an IP loopback address part of one or more default IP loopback addresses, such as at block 110.

If, however, at block 126, the processor determines that there are duplicates, then flow 100 may proceed to block 128. At block 128, the processor may modify a list of IP loopback addresses associated with the IPv4 process to remove the duplicates. In particular, at block 128, the processor may modify the IP loopback addresses associated with the IPv4 process to remove duplicates when an IP loopback address included in the one or more IP loopback addresses received in association with the message and associated with the IPv4 process is determined to also be included in the one or more default IP loopback addresses associated with the IPv4 process. In some embodiments, modification at block 128 may include modification of a list of IP loopback addresses associated with the IPv4 process. According to some embodiments, after modifying the IP loopback addresses associated with the IPv4 process at block 128, flow 100 may proceed to block 122.

Returning to block 112, if, at block 112, the processor determines that no IP loopback addresses to associate with the IPv4 process were received in association with the message and that, at block 104, the processor determined that the configuration parameter is set to indicate that one or more default IP loopback addresses are not to be used as IP loopback addresses to associate with the IPv4 process, then flow 100 may proceed from block 112 to block 122.

In some embodiments, if flow 100 proceeds to block 122 directly from block 112 or block 114, then, at block 122, the processor may complete the configuration of the IPv4 process and exit without outputting an error signal and without having associated an IP loopback address with the IPv4 process being configured on the computing system. In other words, in some embodiments, an exit indicated at block 122 may represent the completion of the configuration of the IPv4 process without associating an IP loopback address with the IPv4 process. For example, in one embodiment, if at block 104, the processor determines that the configuration parameter is not set because it is still in its default setting or that it is set to indicate that no default IP loopback addresses should be inherited, and if at block 112, the processor determines that no addresses of one or more IP loopback addresses to associate with the IPv4 process were received in association with the message, then flow 100 may proceed to block 122 via block 112 or block 114 to complete the configuration of the IPv4 process without associating an IP loopback address with the IPv4 process and exit. Therefore, in some embodiments, the processor may complete the configuration of the IPv4 process without associating an IP loopback address with the IPv4 process when the configuration parameter is determined to not be set to indicate that one or more default IP loopback addresses are to be used as IP loopback addresses to associate with the IPv4 process.

Figure 2:
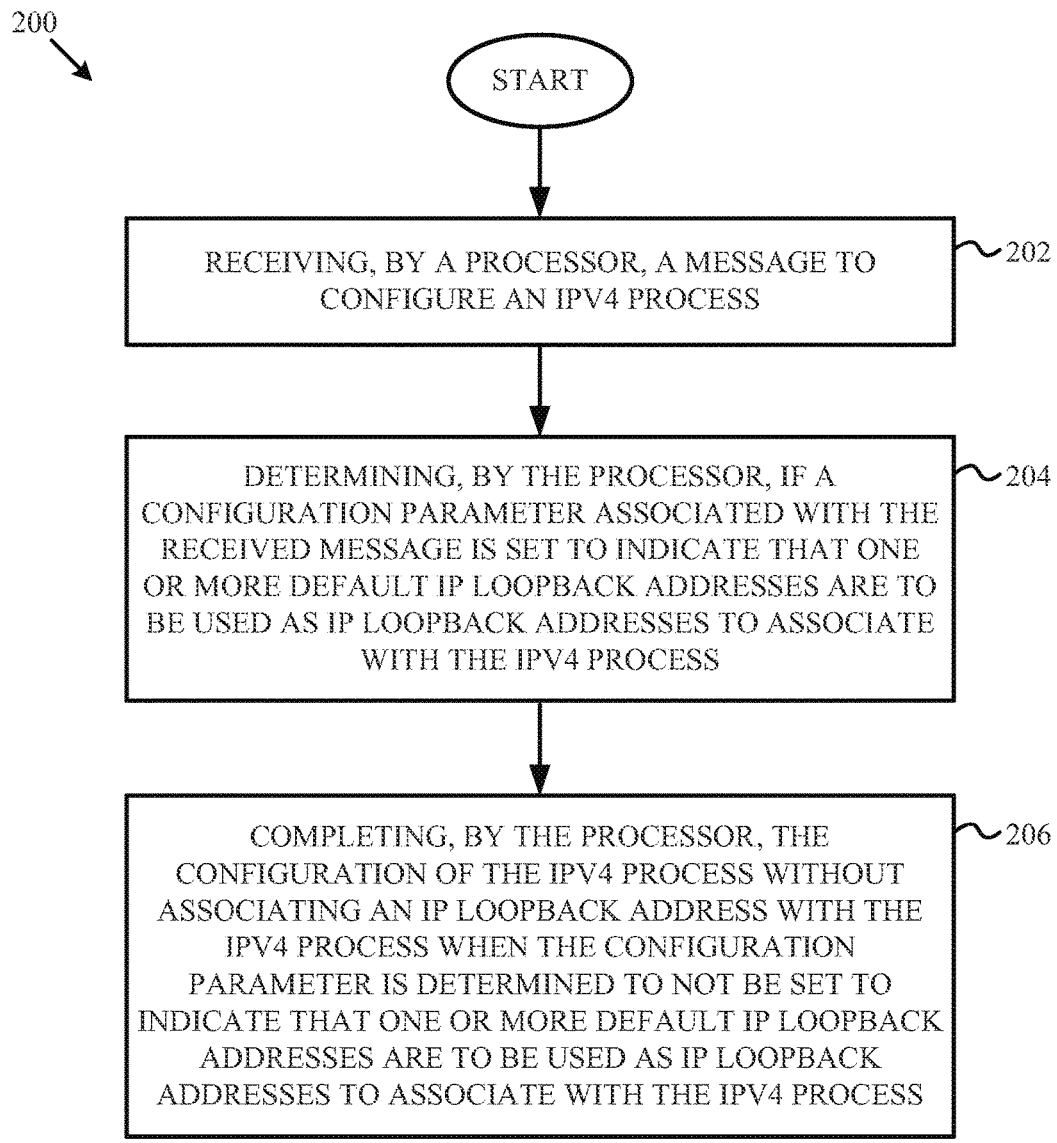
FIG. 2 is a flow chart illustrating a method for configuring a process that uses IPv4 communication without associating the IPv4 process with an IP loopback address according to another embodiment of the disclosure.

FIG. 2 is a flow chart illustrating the configuration of a process that uses IPv4 communication without associating the IPv4 process with an IP loopback address according to one embodiment of the disclosure. It is noted that embodiments of method 200 may be implemented in accordance with the systems and embodiments described herein with respect to FIGS. 3-4. For example, embodiments of method 200 may be implemented by network 300 or computer system 400. In general, embodiments of method 200 may be implemented by other similar systems without deviating from this disclosure so long as the systems, whether directly or indirectly, support the operations as described herein.

Specifically, method 200 includes, at block 202, receiving, by a processor, a message to configure an IPv4 process. At block 204, method 200 includes determining, by the processor, if a configuration parameter associated with the received message is set to indicate that one or more default IP loopback addresses are to be used as IP loopback addresses to associate with the IPv4 process. At block 206, method 200 includes completing, by the processor, the configuration of the IPv4 process without associating an IP loopback address with the IPv4 process when the configuration parameter is determined to not be set to indicate that one or more default IP loopback addresses are to be used as IP loopback addresses to associate with the IPv4 process.

The schematic flow chart diagrams of FIGS. 1 and 2 are generally set forth as logical flow chart diagrams. As such, each depicted order and labeled steps are indicative of one embodiment of the disclosed method. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Figure 3:
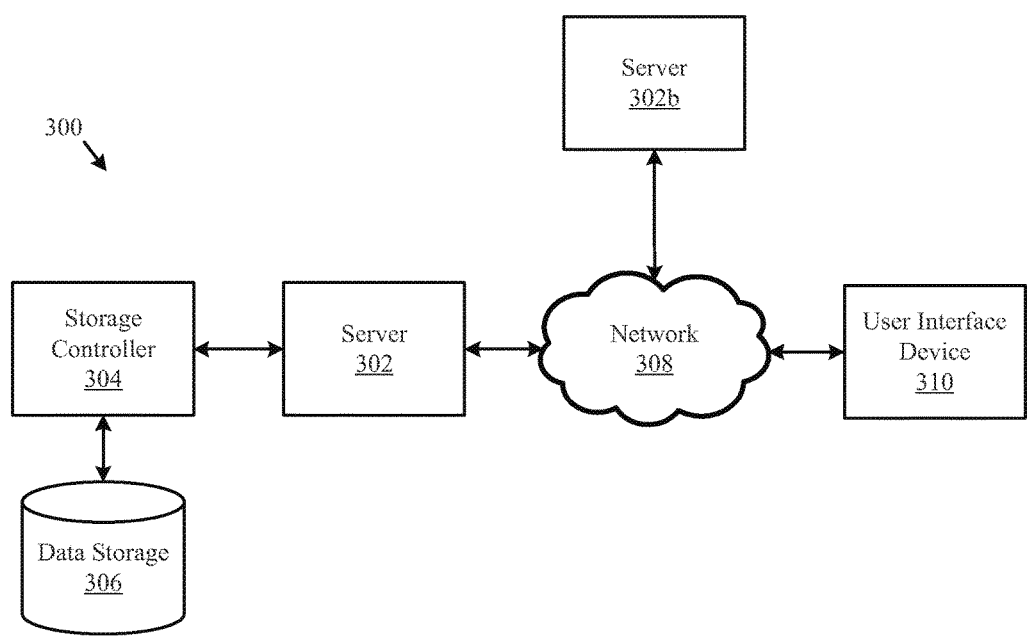
FIG. 3 is a block diagram illustrating a computer network according to one embodiment of the disclosure.

FIG. 3 illustrates one embodiment of a system 300 for configuring a process that uses IPv4 communication without associating the IPv4 process with an IP loopback address according to an embodiment of the disclosure. The system 300 may include a server 302, a data storage device 306, a network 308, and a user interface device 310. The server 302 may also be a hypervisor-based system executing one or more guest partitions hosting operating systems with software modules having server configuration information. In a further embodiment, the system 300 may include a storage controller 304, or a storage server configured to manage data communications between the data storage device 306 and the server 302 or other components in communication with the network 308. In an alternative embodiment, the storage controller 304 may be coupled to the network 308.

In one embodiment, the user interface device 310 is referred to broadly and is intended to encompass a suitable processor-based device, such as a desktop computer, a laptop computer, a personal digital assistant (PDA) or tablet computer, a smartphone or other mobile communication device having access to the network 308. In a further embodiment, the user interface device 310 may access the Internet or other wide area or local area network to access a web application or web service hosted by the server 302 and may provide a user interface for enabling a user to enter or receive information.

The network 308 may facilitate communications of data between the server 302 and the user interface device 310. In some embodiments, the network 308 may also facilitate communication of data between the server 302 and other servers/processors, such as server 302b. For example, the network 308 may include a switched fabric computer network communications link to facilitate communication between servers/processors, also referred to as data storage nodes. In some embodiments, the servers 302 and 302b may represent nodes or clusters of nodes managed by a software framework. The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 4:
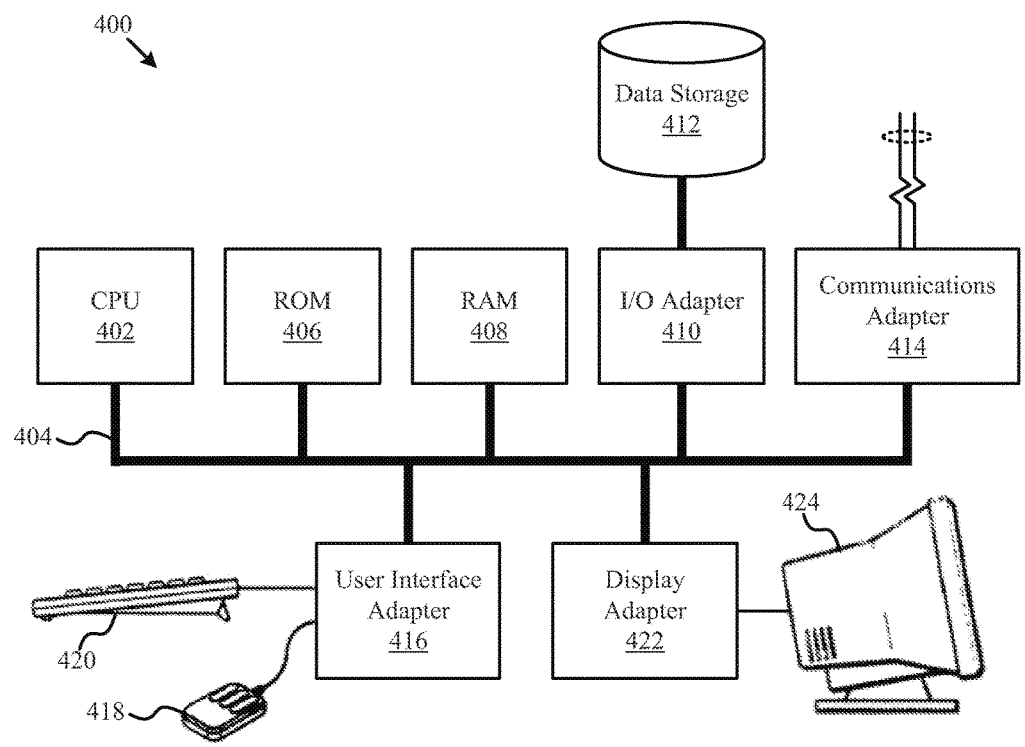
FIG. 4 is a block diagram illustrating a computer system according to one embodiment of the disclosure.

FIG. 4 illustrates a computer system 400 adapted according to certain embodiments of a server and/or a user interface device. The central processing unit ("CPU") 402 is coupled to the system bus 404. The CPU 402 may be a general purpose CPU or microprocessor, graphics processing unit ("GPU"), and/or microcontroller. Thus, a processor as disclosed herein may refer to a single processor or multiple processors operating in a collaborative fashion as one processor. The present embodiments are not restricted by the architecture of the CPU 402 so long as the CPU 402, whether directly or indirectly, supports the operations as described herein. The CPU 402 may execute the various logical instructions according to the present embodiments.

The computer system 400 may also include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 406 hold user and system data, and both the RAM 408 and the ROM 406 may be randomly accessed.

The computer system 400 may also include an input/output (I/O) adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400. According to one embodiment, the data storage 412 may be a separate server coupled to the computer system 400 through a network connection to the I/O adapter 410. The communications adapter 414 may be adapted to couple the computer system 400 to a network, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computer system 400. Rather the computer system 400 is provided as an example of one type of computing system that may be adapted to perform the functions of a server and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 400 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable media, instructions and/or data may be provided as signals on transmission media included in a communication apparatus. For example, a communication apparatus may include a transceiver having signals indicative of instructions and data. The instructions and data may be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for configuring a process that uses IPv4 communication, comprising:
   receiving, by a processor, a message to configure the IPv4 process, the message including a configuration parameter, wherein the configuration parameter is set, indicating that one or more default IP loopback addresses are to be used as IP loopback addresses to associate with the IPv4 process, or the configuration parameter is not set, indicating that one or more default IP loopback addresses are not to be used as IP loopback addresses to associate with the IPv4 process;
   determining, by the processor, whether the configuration parameter associated with the received message is set or not set;
   in response to determining that the configuration parameter is not set, completing, by the processor, the configuration of the IPv4 process without associating an IP loopback address with the IPv4 process;
   in response to determining that the configuration parameter is set, determining, by the processor, whether the one or more default IP loopback addresses exist in a memory; and
   in response to determining that the one or more default IP loopback addresses exist in the memory when the configuration parameter is set, associating, by the processor, an IP loopback address of the one or more default IP loopback addresses existing in the memory with the IPv4 process.

2. The method of claim 1, further comprising:
   outputting an error signal when the one or more default IP loopback addresses are determined to not exist in the memory and the configuration parameter is determined to be set to indicate that the one or more default IP loopback addresses are to be used as the IP loopback addresses to associate with the IPv4 process.

3. The method of claim 1, further comprising:
   determining if addresses of one or more IP loopback addresses to associate with the IPv4 process have been received in association with the message; and
   associating the one or more IP loopback addresses with the IPv4 process when the addresses of the one or more IP loopback addresses to associate with the IPv4 process are received in association with the message.

4. The method of claim 3, further comprising:
   determining if an IP loopback address included in the one or more IP loopback addresses received in association with the message is also included the one or more default IP loopback addresses; and
   modifying a list of IP loopback addresses associated with the IPv4 process to remove duplicates when an IP loopback address included in the one or more IP loopback addresses received in association with the message is determined to also be included in the one or more default IP loopback addresses.

5. A computer program product, comprising:
   a non-transitory computer readable medium comprising instructions which, when executed by a processor of a computer system, cause the processor to perform the steps of:
     receiving a message to configure an IPv4 process, the message including a configuration parameter, wherein the configuration parameter is set, indicating that one or more default IP loopback addresses are to be used as IP loopback addresses to associate with the IPv4 process, or the configuration parameter is not set, indicating that one or more default IP loopback addresses are not to be used as IP loopback addresses to associate with the IPv4 process;
     determining whether the configuration parameter associated with the received message is set or not set;
     in response to determining that the configuration parameter is not set, completing the configuration of the IPv4 process without associating an IP loopback address with the IPv4 process;

in response to determining that the configuration parameter is set, determining whether the one or more default IP loopback addresses exist in a memory; and in response to determining that the one or more default IP loopback addresses exist in the memory when the configuration parameter is set, associating an IP loopback address of the one or more default IP loopback addresses existing in the memory with the IPv4 process.

6. The computer program product of claim 5, wherein the medium further comprises instructions which cause the processor to perform the step of:

outputting an error signal when the one or more default IP loopback addresses are determined to not exist in the memory and the configuration parameter is determined to be set to indicate that the one or more default IP loopback addresses are to be used as the IP loopback addresses to associate with the IP process.

7. The computer program product of claim 5, wherein the medium further comprises instructions which cause the processor to perform the steps of:

determining if addresses of one or more IP loopback addresses to associate with the IPv4 process have been received in association with the message; and associating the one or more IP loopback addresses with the IPv4 process when the addresses of the one or more IP loopback addresses to associate with the IPv4 process are received in association with the message.

8. The computer program product of claim 7, wherein the medium further comprises instructions which cause the processor to perform the steps of:

determining if an IP loopback address included in the one or more IP loopback addresses received in association with the message is also included in the one or more default IP loopback addresses; and modifying a list of IP loopback addresses associated with the IPv4 process to remove duplicates when an IP loopback address included in the one or more IP loopback addresses received in association with the message is determined to also be included in the one or more default IP loopback addresses.

9. An apparatus, comprising:

a memory; and a processor coupled to the memory, wherein the processor is further configured to perform the steps of:

receiving a message to configure an IPv4 process, the message including a configuration parameter, wherein the configuration parameter is set, indicating that one or more default IP loopback addresses are to be used as IP loopback addresses to associate with the IPv4 process, or the configuration parameter is not set, indicating that one or more default IP loopback addresses are not to be used as IP loopback addresses to associate with the IPv4 process;

determining whether the configuration parameter associated with the received message is set or not set;

in response to determining that the configuration parameter is not set, completing the configuration of the IPv4 process without associating an IP loopback address with the IPv4 process;

in response to determining that the configuration parameter is set, determining whether the one or more default IP loopback addresses exist in a memory; and in response to determining that the one or more default IP loopback addresses exist in the memory when the configuration parameter is set, associating an IP loopback address of the one or more default IP loopback addresses existing in the memory with the IPv4 process.

10. The apparatus of claim 9, wherein the processor is further configured to perform the step of:

outputting an error signal when the one or more default IP loopback addresses are determined to not exist in the memory and the configuration parameter s determined to be set to indicate that the one or more default IP loopback addresses are to be used as the IP loopback addresses to associate with the IPv4 process.

11. The apparatus of claim 9, wherein the processor is further configured to perform the steps of:

determining if addresses of one or more IP loopback addresses to associate with the IPv4 process have been received in association with the message; and associating the one or more IP loopback addresses with the IPv4 process when the addresses of the one or more IP loopback addresses to associate with the IPv4 process are received in association with the message.

12. The apparatus of claim 11, wherein the processor is further configured to perform the steps of:

determining if an IP loopback address included in the one or more IP loopback addresses received in association with the message is also included in the one or more default IP loopback addresses; and modifying a list of IP loopback addresses associated with the IPv4 process to remove duplicates when an IP loopback address included in the one or more IP loopback addresses received in association with the message is determined to also be included in the one or more default IP loopback addresses.

* * * * *